LEONARD & RYDER.
Molding Candles.
No. 26,440.  Patented Dec. 13, 1859.
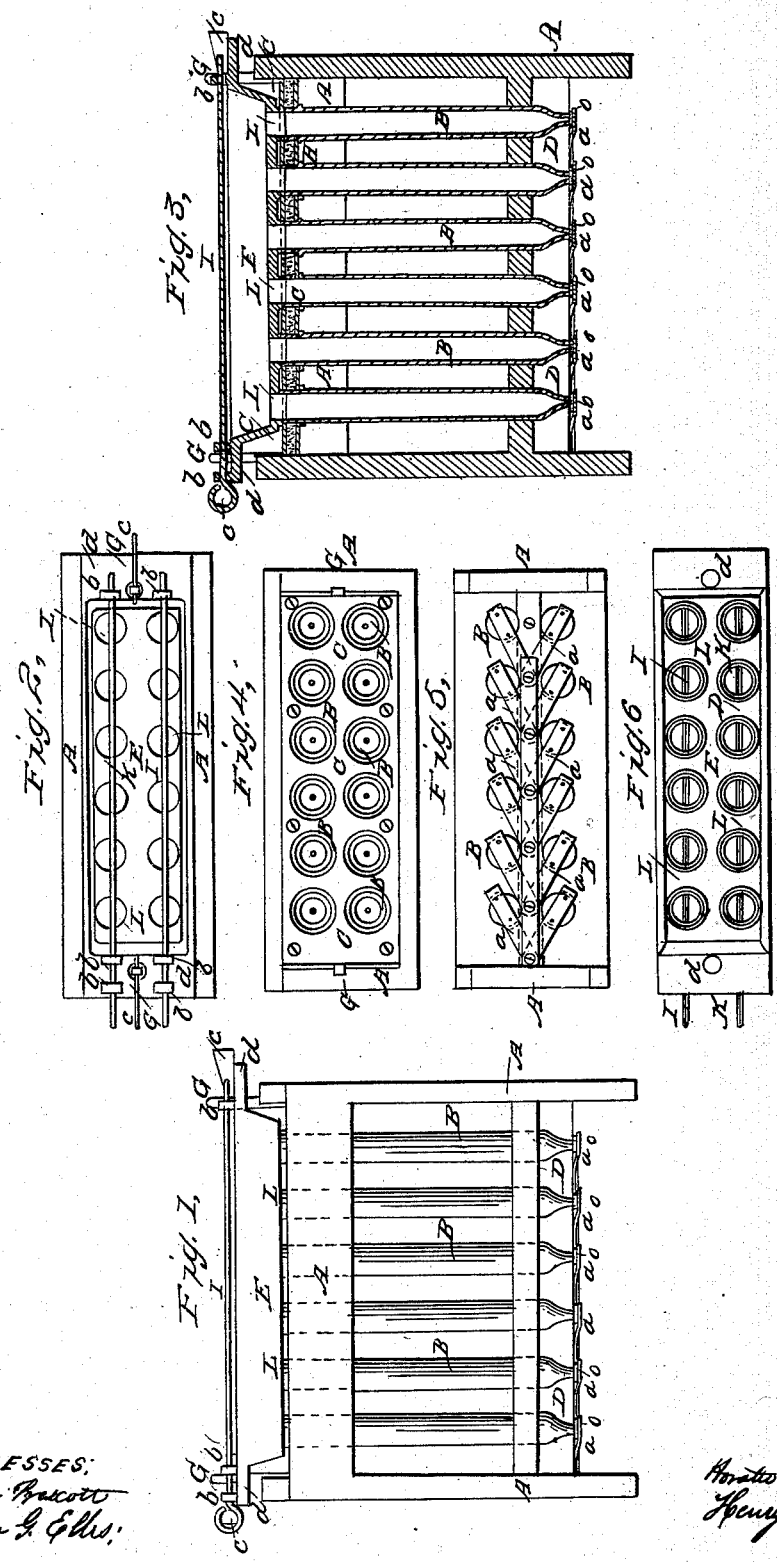

UNITED STATES PATENT OFFICE.

HORATIO LEONARD AND HENRY RYDER, OF NEW BEDFORD, MASSACHUSETTS.

APPARATUS FOR MOLDING CANDLES.

Specification of Letters Patent No. 26,440, dated December 13, 1859.

*To all whom it may concern:*

Be it known that we, HORATIO LEONARD and HENRY RYDER, of New Bedford, in the county of Bristol and State of Massachusetts, have invented an Improved Apparatus for Molding Paraffin or other Candles; and we do hereby declare that the same is fully described and represented in the following specification and the accompanying drawings, of which—

Figure 1, denotes a side elevation of the said apparatus; Fig. 2, a top view. Fig. 3, is a vertical and longitudinal section, taken through one series of the molds. Fig. 4, denotes a top view as it appears with the receiver or trough removed. Fig. 5, is an underside view of said apparatus, and Fig. 6, is an underside view of the receiver or vessel for receiving the melted paraffin.

In the manufacture of paraffin candles, it is found that their contraction in the molds during the process of cooling or hardening, is very little, and that they adhere so firmly to the molds, as to render their removal therefrom, very difficult, particularly if the molds are constructed like those usually employed in making sperm, tallow and stearin candles; and besides the paraffin being so rich in carbon, renders it necessary to make their wicks much smaller in diameter, than those of sperm, wax, tallow or stearin, and consequently it is entirely impracticable, if not impossible, to extract the candles from their molds by draft on their wicks.

To overcome this difficulty has been one great object of our invention; the nature of which consists, first, in a peculiar construction and application of a removable receiver or trough to the top surface of the mold or series of molds, whereby when the molds may have been filled with the paraffin or material to be molded, the surplus left in the said receiver, when cooled shall form a plate or serve as shoulders to the candles, whereby they can be easily extracted from their molds, by simply raising upward the receiver.

It also consists in a peculiar mode of packing or closing the orifices at the lower parts or tips of the molds in order to prevent leakage therefrom, the same being as hereinafter set forth.

In the drawing, A, represents the frame of the machine or apparatus, which is provided with one or more series of molds, B, B, B, B, &c., arranged in the frame as shown in Fig. 1. The top surfaces of the said molds come up flush with a horizontal metallic plate, C, and are firmly secured thereto in the usual manner. The body of each mold is of a cylindrical or slightly tapering shape, and has a conical tip of the usual form applied to its lower end. For the purpose of rendering the lower end of the tip or the wick orifice tight, or so as to prevent leakage therefrom, we apply to the lower longitudinal bar, D, one or more series of springs, or elastic bars, $a, a, a$, &c. (corresponding in number with the number of the molds) each of which is provided, on its top surface, with a strip of india rubber, $o$, or other suitable elastic material, as shown in the drawings. The inner end of each of such springs being so connected to the said bar by means of pivots or screws, as to render them capable of being slightly rotated, so as either to bring the rubber in contact with the tips, or remove it therefrom as circumstances may require.

For the purpose of enabling us to remove the candles from the molds when formed, we make the trough or receiver E, separate from the molds, and so apply it thereto as to enable it to be easily removed therefrom. The said receiver has a rectangular, or any other proper shape, as shown in the drawings, and is secured to the frame A, by means of vertical standards, G, G, extending up from the sides of the frame and passing through holes, formed through the flanges, $d, d$, of the receiver, the same being as shown in Fig. 2. Moreover, tapering keys, $c, c$, passing through the vertical standards, serve to keep the receiver in its proper position. Through the bottom of said receiver or trough, cylindrical or other proper shaped holes, corresponding in number with the number of the molds, are made, each having a diameter a little greater than the top of the mold over which it is to be placed—and moreover, in order to insure a perfect or water tight connection between the receiver, E, and the molds, B, B, &c., we form on the underside of said receiver, and around each hole made through it, a hollow cylindrical extension L, (as shown in Fig. 6,) which rests on or is packed by a sheet of vulcanized rubber or other suitable elastic material, which is firmly confined to the plate, C, by means of a metallic plate, H, formed as shown in Fig. 4, and moreover, the said sheet of rubber has cylindrical holes, cut through it, corresponding in diameter to that of the base of each mold, the center of the mold, the center of the packing, and the center of the extension being supposed to be in the same line. Furthermore on the top of the said receiver, vertical projections, $b$, $b$, $b$, $b$, are cast or formed as shown in Fig. 1, the same having holes or slots formed horizontally through them, for the reception of rods or bars I, K, around which the wicks of the candles are to be passed.

By the above arrangement of parts, we are enabled to make a perfectly tight connection between the receiver and the molds.

In operating with the above apparatus; after the molds have been filled with paraffin, and the candles become sufficiently cooled, we first remove the keys from the vertical standards, so as to allow the trough to be raised upward. Next by taking hold of the projections or flanges, $d$, $d$, we raise the said receiver upward, and the candles from the molds. After they are drawn out we saw them off just below the cylindrical projections, L, L, &c., on the underside of the receiver. The receiver is next reheated, and the tops of the candles or surplus material in the receiver melted, the rods are then removed, and the portions of the wick taken from their bars or rods.

Having described our invention, what we claim, is as follows;—

1. We claim making the receiver or trough, E, separate from the body of the mold, or series of molds, and so constructed and arranged as to operate therewith, substantially in manner, and for the purpose set forth.

2. We also claim the herein described improved mode of packing the lower orifice of the mold, viz. by means of a spring, $a$, furnished with rubber or other proper elastic material, the same being arranged and made to operate with respect to the said orifice, as set forth.

HORATIO LEONARD.
HENRY RYDER.

Witnesses:
OLIVER PRESCOTT,
ALDEN G. ELLIS.